United States Patent Office 2,905,529
Patented Sept. 22, 1959

2,905,529
PREPARATION OF ENGEL'S SALT

Maurice Rubin and Georges Hulot, Paris, France, assignors to Societe d'Etudes Chimiques pour l'Industrie et l'Agriculture, Paris, France, a company of France No Drawing. Application December 2, 1955
Serial No. 550,798

Claims priority, application France December 7, 1954

8 Claims. (Cl. 23—61)

This invention relates to the preparation of the double salt of potassium bicarbonate and magnesium carbonate tetrahydrate $HKCO_3 \cdot MgCO_3 \cdot 4H_2O$, otherwise known as Engel's salt. One conventional process for preparing this compound is by treating a concentrated potassium chloride solution with magnesium carbonate and carbon dioxide gas under pressure. The reaction leads to a formation of magnesium chloride $MgCl_2$ and the desired Engel's salt precipitates from the solution. However, this process requires the use of magnesium carbonate in the form of the trihydrate $MgCO_3 \cdot 3H_2O$, which is difficult to prepare and expensive.

Another known method involves the simultaneous action of carbon dioxide and ammonia on solutions of potassium chloride and soluble magnesium salts such as magnesium sulfate or magnesium chloride. In certain modifications of the method, ammonium carbonate and carbon dioxide are used, and solid ammonium bicarbonate has also been tried. All methods of this type however result in a comparatively poor yield, not higher than about 50% in terms of the potassium initially present. The reason for this is the tendency towards a co-precipitation of Engel's salt with the corresponding double salt of ammonium and magnesium

so that it is found necessary to operate with a large excess of the potassium salt over the stoichiometrical amount thereof in order to obtain a saturated final mother-liquor and thus hinder the precipitation of the double ammonium magnesium salt. In order that the process should be a paying one, it is necessary to recover from the final solution not only the ammonia, but also the unconverted potassium chloride, and whatever the operating procedure used to effect such recovery, it is found that the complex and costly operations required therefor render such methods commercially impracticable.

It is therefore an object of this invention to prepare Engel's salt more economically than was heretofore possible. Another object is to provide a method of directly precipitating Engel's salt from potassium containing solutions with a comparatively high yield in terms of potassium content. Further objects and advantages will be made clear as the disclosure proceeds.

This invention is based on the discovery that Engel's salt can be directly precipitated with high yields if the ammonia in the second-above-mentioned method of preparation, is replaced with an aliphatic amine. Primary, secondary and/or tertiary amines may be used. The final mother-liquor or residual solution in the process of the invention is found to contain only very small residual amounts of potassium; hence it is only necessary to employ substantially stoichiometrical proportions of the potassium salt.

Thus, starting for example from potassium chloride and magnesium chloride, the reaction according to the invention may be written:

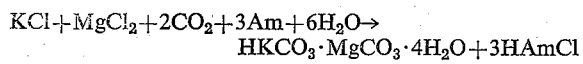

where Am represents a primary, secondary or tertiary aliphatic amine.

The amount of amine used may be just equal to or slightly in excess of the quantity theoretically required by the reaction, the excess preferably not exceeding 10% in order that the ultimate recovery of the amine may be effected under economical conditions. As to the proportion of carbon dioxide, the amount used need only be that corresponding to the theoretical $CO_2$ content in Engel's salt; however an excess of $CO_2$ may be used without adverse effects.

Various different operating procedures may be employed in practically carrying out the method of the invention, and a few exemplary ones of such procedures will now be described without any intention of limiting the scope of the invention thereby:

(1) A stream of carbon dioxide gas pure or diluted in an inert gas is passed through a solution of amine in water. The salts of magnesium and potassium, in solid form or in aqueous solution, are then added into the carbonated amine solution and the mixture is stirred moderately for about one hour at room temperature (20 to 25° C.). There is produced a precipitate which is readily separable from the solution by filtration. The separated precipitate is washed and dried. The composition of the resulting product is found to correspond substantially with the theoretical composition of Engel's salt.

(2) Into a water solution of amine, potassium and magnesium salts are introduced in solid form or in aqueous solution and a stream of $CO_2$ pure or diluted in inert gas is bubbled through the solution. After complete carbonatation the resulting precipitate is filtered off and is found to comprise at least 97% of Engel's salt.

(3) To a solution of potassium and magnesium salts there is added amine bicarbonate in solid or dissolved condition. After stirring for about one hour, a precipitate is separated which contains about 90% of Engel's salt.

The method possesses great flexibility since it admits of a variety of operating procedures all conducive to high yields. The small amounts of impurities that will sometimes precipitate together with the desired salt are found to contain magnesia hydrate and/or magnesium carbonate exclusively. In some cases it may be desirable to promote a co-precipitation of these magnesium compounds so as to obtain as a final product a mixture that is richer in magnesium than is the actual Engel's salt.

Regardless of the operating procedure used, the final liquor only contains very small amounts of potassium and magnesium. Concentrations of less than 0.3% of K and 0.1% of Mg can be obtained in the final liquor, corresponding to yields not less than 95% of the basis of the K and not less than 97% on the basis of the Mg originally introduced.

The very low content of potassium and magnesium salts in the residual solution is a great advantage of the method of the invention. Because of this circumstance the recovery of the amine from the residual solution in the form of the hydrochloride, may be effected with great simplicity by any known method, e.g. by distillation in the presence of lime. After separation of the amine the remaining solution may be discarded without impairing the economy of the process since the K and Mg contents therein are negligibly low.

The starting material in the method of the invention may comprise a soluble salt of potassium, such as the chloride, sulfate, or the like, or any double salt containing a soluble potassium salt. The natural double salts of potassium and magnesium, such as carnallite, are especially satisfactory. Aside from soluble magnesium salts, insoluble magnesium salts, or magnesia, may also be used according to the invention.

The aliphatic amine is preferably selected from among those having a boiling point not higher than 100° C., so that the ultimate recovery thereof from the solution will be more economical.

A few examples of practical performance of the improved method will now be described in greater detail for purposes of illustration but not of limitation.

*Example 1*

A stream of carbon dioxide gas is passed through a mixture of triethylamine and water containing 40% amine by weight. The carbonation is arrested after the mixture has absorbed about 2 moles $CO_2$ for 3 moles amines. To 198 cc. of this carbonated solution there are added 64 grams carnallite and the mixture is stirred about one hour at room temperature. The resulting precipitate is filtered off. The mother liquor contains 0.2% K and traces of Mg too small for quantitative determination.

The precipitate is washed and dried and on analysis is found to have the following composition: 15.0% K, 9.64% Mg and 46.4% $CO_3$. This substantially corresponds to the theoretical composition of Engel's salt, which is: 15.25% K, 9.5% Mg and 46.8% $CO_3$.

*Example 2*

Through an aqueous diethylamine solution containing 30% of the amine by weight, there is passed a stream of carbon dioxide gas containing 30% $CO_2$ until the solution contains 2 moles $CO_2$ for every 3 moles amine. Carnallite is then added in the amount of 250 grams and the mixture is stirred for about an hour at room temperature.

The resulting precipitate after washing and drying analyses 15.4% K, 9.6% Mg and 46.65% $CO_3$. The final mother liquor contains 0.2% K and 0.01% Mg.

*Example 3*

An aqueous isopropylamine solution initially containing 38% amine by weight is carbonated.

To 520 cc. of the carbonated solution there is added a solution of carnallite in water containing 250 grams of salt and 430 cc. of water. After stirring one hour at room temperature, the precipitate is separated, washed and dried, and is found on analysis to contain 14.9% K, 9.9% Mg and 45.15% $CO_3$. The filtrate contains 0.3% K and 0.01% Mg.

*Example 4*

In 140 g. water there are dissolved 38 g. KCl and 102 g. $MgCl_2, 6H_2O$. To this solution there is added 110 grams isopropylamine titling 91% of the amine by weight. A stream of carbon dioxide is bubbled through the mixture with moderate stirring at ordinary temperature. On completion of the carbonatation, the mixture is filtered, the separated product washed and dried, and found to contain 14.6% K, 11.2% Mg and 45.4% $CO_3$. The final mother liquor contains 0.2% K and 0.01% Mg.

*Example 5*

Through an aqueous dimethylamine solution containing 30% of the amine by weight, there is passed a stream of carbon dioxide gas. In this carbonated solution are added 110 grams of carnallite and the mixture is stirred for about two hours at room temperature.

The insoluble product is filtered, washed and dried; it contains 14.7% K, 10.35% Mg and 44.8% $CO_3$.

*Example 6*

In an aqueous solution of carbonated n-butylamine which contains 26.8% of amine and 10.8% of $CO_2$ are added 100 grams of carnallite. After two hours of moderate stirring at room temperature, the insoluble product is separated, washed and dried. It contains 15.1% K, 9.75% Mg, 46.1% $CO_3$; the final mother liquor contains 0.2% K and 0.07% Mg.

While the operating temperature is not critical it is preferred to operate in a range of from 0 to 45° C.

What we claim is:

1. A method of preparing a magnesium- potassium-compound consisting essentially of $KHCO_3 \cdot MgCO_3 \cdot 4H_2O$ containing a small amount of impurities which comprises reacting carbon dioxide, an aliphatic alkylamine, a water-soluble inorganic potassium salt and a magnesium compound selected from the group consisting of magnesium chloride, magnesium sulfate and magnesium oxide in an aqueous medium, thereby precipitating substantially all potassium ions as $KHCO_3 \cdot MgCO_3 \cdot 4H_2O$ and separating the said precipitate.

2. A method of preparing the compound $$KHCO_3 \cdot MgCO_3 \cdot 4H_2O$$

which comprises reacting carbon dioxide, an aliphatic alkylamine, a water-soluble inorganic potassium salt and a magnesium compound selected from the group consisting of magnesium chloride, magnesium sulfate and magnesium oxide in an aqueous medium, thereby precipitating substantially all potassium ions as $$KHCO_3 \cdot MgCO_3 \cdot 4H_2O$$

and separating the said precipitate.

3. The method of claim 1 wherein the reaction temperature is in a range of from about 0° C. to about 45° C.

4. The method of claim 1 wherein the potassium is in the form of a composite salt containing potassium and magnesium in the form of water-soluble inorganic salts.

5. The method of claim 1 wherein the aliphatic alkylamine is selected from the group consisting of primary, secondary and tertiary aliphatic alkylamines having a boiling point in the range of from about 0 to 100° C.

6. The method of claim 5 wherein the aliphatic alkylamine is selected from the group consisting of primary, secondary and tertiary aliphatic alkylamines comprising methylamines, ethylamines, propylamines and butylamines.

7. The method of claim 5 including the recovery of the amine from the residual liquor.

8. The method of claim 6 including the recovery of the amine from the residual liquor.

References Cited in the file of this patent

UNITED STATES PATENTS

| | | |
|---|---|---|
| 2,752,222 | Birman | June 26, 1956 |
| 2,768,060 | Follows | Oct. 23, 1956 |
| 2,782,093 | Hulot et al. | Feb. 19, 1957 |

FOREIGN PATENTS

| | | |
|---|---|---|
| 3,967 | Great Britain | Oct. 9, 1878 |
| | of 1878 | |
| 291,417 | Germany | Apr. 15, 1916 |